(12) United States Patent
Fan

(10) Patent No.: US 7,512,144 B2
(45) Date of Patent: Mar. 31, 2009

(54) METHOD AND SYSTEM FOR TRANSMISSION CONTROL PROTOCOL (TCP) RETRANSMIT PROCESSING

(75) Inventor: Kan Frankie Fan, Diamond Bar, CA (US)

(73) Assignee: Broadcom Corporation, Irvine, CA (US)

( * ) Notice: Subject to any disclaimer, the term of this patent is extended or adjusted under 35 U.S.C. 154(b) by 825 days.

(21) Appl. No.: 11/001,230

(22) Filed: Nov. 30, 2004

(65) Prior Publication Data

US 2005/0135412 A1 Jun. 23, 2005

Related U.S. Application Data

(60) Provisional application No. 60/531,400, filed on Dec. 19, 2003.

(51) Int. Cl.
*H04L 12/28* (2006.01)
*H04L 12/56* (2006.01)

(52) U.S. Cl. .................................................. 370/419

(58) Field of Classification Search ................ 370/419; 714/748; 709/230
See application file for complete search history.

(56) References Cited

U.S. PATENT DOCUMENTS

2004/0062267 A1* 4/2004 Minami et al. .............. 370/463

* cited by examiner

*Primary Examiner*—Kevin C Harper
(74) *Attorney, Agent, or Firm*—McAndrews, Held & Malloy, Ltd.

(57) ABSTRACT

Certain aspects of the present invention for transmission control protocol (TCP) retransmission processing may comprise receiving a request for packet retransmission to be processed by an offload network interface card (NIC). A remote peer, a retransmission timer, or a fast retransmission signal may initiate the request. The NIC processes the request information and sends notification to the host of the request. The host searches the TCP buffers of the TCP transmission window in host memory for the packet. Once the packet is located, the host may send the offload NIC the buffer descriptors containing data that locates the packet in host memory. The offload NIC may retrieve the packet from host memory and may retransmit the packet according to the request information. The offload NIC may send notification to the host that the packet has been retransmitted.

25 Claims, 3 Drawing Sheets

METHOD AND SYSTEM FOR TRANSMISSION CONTROL PROTOCOL (TCP) RETRANSMIT PROCESSING

CROSS-REFERENCE TO RELATED APPLICATIONS/INCORPORATION BY REFERENCE

This application makes reference to, claims priority to, and claims the benefit of: U.S. Provisional Application Ser. No. 60/531,400 filed Dec. 19, 2003.

FIELD OF THE INVENTION

Certain embodiments of the invention relate to transmission control protocol (TCP). More specifically, certain embodiments of the invention relate to a method and system for TCP retransmit processing.

BACKGROUND OF THE INVENTION

The initial development of transmission control protocol (TCP) was based on networking and processing capabilities that were then currently available. As a result, various fundamental assumptions regarding its operation were prefaced on networking and processor technologies that existed at that time. The scarcity and high cost of network bandwidth and the partially limitless processing resources available from a host processor were among the various assumptions on which TCP was prefaced. With the advent of faster network technologies such as Gigabit Ethernet (GbE), the fundamental assumptions on which TCP was prefaced have changed radically. Network bandwidth is no longer as scarce and as expensive as it once was while host processing resources are now regarded as being limited when once they were plentiful. In this regard, the original constraints have shifted from limitations in network bandwidth to bottlenecks between host processor and host memory.

Host processing systems are not only responsible for providing faster network connections but must also execute system applications. Shifting more of the host processing resources to provide faster network connections will do little to address the fundamental change in assumptions. Notably, using a larger portion of host processing resources to execute TCP applications would occur at the expense of executing system applications, thereby resulting in an overall degradation in system performance rather than in the desired improvement in network connectivity.

Although new networking architectures and protocols may be created to address the fundamental shift in assumptions, these new architectures and protocols may still have to provide support for an extensive network of current and legacy systems. These new solutions may be required to address the shift in assumptions and, in doing so, alleviate any bottlenecks that may now result by the demands being placed on host processing systems.

A transmission control protocol/internet protocol (TCP/IP) offload engine may be utilized in a network interface card (NIC) to redistribute TCP processing from the host onto specialized processors for handling TCP processing more efficiently. The TCP offload engines may have specialized architectures and suitable software or firmware that allows them to efficiently implement various TCP algorithms for handling faster network connections, thereby allowing host processing resources to be allocated or reallocated to system application processing.

In order to alleviate the consumption of host resources by networking applications, a TCP connection can be offloaded from a host to a dedicated TCP/IP offload engine (TOE) in a NIC. Some of the host resources released by offloading may include CPU cycles and subsystem memory bandwidth, for example. During the offload process, TCP connection state information may be offloaded from the host, for example, from a host software stack, to the TOE. A TCP connection may be in any one of a plurality of states at a given time. To process the TCP connection, TCP software applications may be adapted to manage various TCP defined states. Being able to manage the various TCP defined states may require a high level of architectural complexity in the TOE.

In some instances, offloading information on all TCP defined states to the TOE may not be necessary because many of the TCP states such as CLOSING, LAST_ACK and FIN_WAIT_2 may not be performance sensitive. Furthermore, many of these non-performance sensitive states may consume substantial processing resources to handle error conditions and potentially malicious attacks, for example. These are but some of the factors that may substantially increase the cost of building and designing the TOE. In addition, a TOE that has control, transferred from the host, of all the state variables of a TCP connection may be quite complex. Such complexity may require the use of considerable processing power and may also require and/or consume a lot of TOE onboard-memory. Moreover, the TCP connection offloaded to the TOE that has control, transferred from the host, of all the state variables of the TCP connection may be inflexible and susceptible to connection loss.

When a host system offloads TCP transmission support to a TOE, the TOE must also have a mechanism in place to handle any network requests for retransmission. For example, retransmission may occur from a timer expiration mechanism or from a fast retransmit mechanism generated by the TCP transmission applications in the TOE. Timer expiration may occur when an acknowledgement is not received from a remote peer that a packet has been received within a certain amount of time from transmission. Fast retransmission may occur when the TOE may deduce or determine that a packet has not been received from the acknowledgement of other packets transmitted. In this regard, acknowledgement may be provided on a packet-by-packet basis or on a byte-by-byte basis.

A copy of the packets and/or bytes to be transmitted may be kept in the NIC in order to provide direct access to the data for transmission and retransmission operations. Supporting retransmission, however, may require more hardware storage capacity than the NIC may be able to support. In this regard, the limited storage capacity of the NIC may result in a slowdown in transmission, which is the problem that the offloading of TCP operations was intended to address.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in a method and system for improving performance of a network computing device that may be adapted for TCP retransmit processing. Aspects of the method for packet transmission may comprise identifying data from a transmission window to be retransmitted by an offload NIC. The identified data may be at least a byte of a packet from the transmission window. The method may also comprise acquiring from a host information related to the identified data to be retransmitted. The identified data may be retransmitted based on the acquired information without storing at least a portion of the transmission window onto the offload NIC.

Aspects of the method may also comprise receiving acknowledgement information from at least one remote peer to determine the identified data to be retransmitted. The identified data may be determined based on the received acknowledgement information and on a retransmission timer mechanism or a fast retransmit mechanism. The host may be notified as to the identified data to be retransmitted. The acquired information related to said identified data to be retransmitted may be located and transferred to the offload NIC. The identified data to be retransmitted may then be retrieved based on the located acquired information.

Another aspect of the invention may be a machine-readable storage having stored thereon, a computer program having at least one code section for packet transmission, the at least one code section being executable by a machine for causing the machine to perform steps as described above for TCP retransmission processing.

Certain aspects of the system for packet transmission may comprise at least one processor that identifies data from a transmission window to be retransmitted by an offload NIC. The processor may be a portion of the offload NIC. The processor may also acquire from a host information related to the identified data to be retransmitted. The processor may retransmit the identified data based on the acquired information without storing at least a portion of the transmission window onto the offload NIC.

In another aspect of the system, the processor may identify at least a byte of a packet from the transmission window to be retransmitted. The processor may receive acknowledgement information from at least one remote peer to determine the identified data to be retransmitted. Based on the received acknowledgement information and on a retransmission timer mechanism or a fast retransmit mechanism, the processor may determine the identified data. The processor may also notify the host of the identified data to be retransmitted. The processor may locate the acquired information related to the identified data and may transfer the acquired information to the offload NIC. The processor may retrieve the identified data from the host based on the located acquired information.

These and other advantages, aspects and novel features of the present invention, as well as details of an illustrated embodiment thereof, will be more fully understood from the following description and drawings.

DETAILED DESCRIPTION OF THE INVENTION

Aspects of the present invention may be found in a method and system for improving performance of a network computing device that may be adapted for TCP retransmit processing. Aspects of the method for packet and/or byte transmission may comprise identifying data, whether a packet and/or byte, from a TCP transmission window that needs to be retransmitted by an offload Network Interface Card (NIC). The offload NIC may acquire from a host data descriptors that indicate the location in memory of the data to be retransmitted. Once the data is located in host memory, retransmitting the data may proceed without storing at least a portion of the TCP transmission window on the offload NIC. Request for retransmission may result from a retransmission timer or from a fast retransmit signal. The offload NIC may be utilized to process the request for retransmission and may signal the host that retransmission of a portion of a transmission window is needed.

The host may receive the request information and may initiate a search of the host memory for the data by looking into the TCP buffers that hold the TCP transmission window. Once the data is found, the host may identify the location of the data by storing the location data in buffer descriptors. The host may send the data or packet buffer descriptors to the NIC for retransmission. The offload NIC may retrieve the data from host memory by using the packet buffer descriptors and may retransmit the data in accordance with the retransmission timer or the fast retransmit mechanisms. The method may further comprise notifying the host that the data has been retransmitted.

Figure 1:
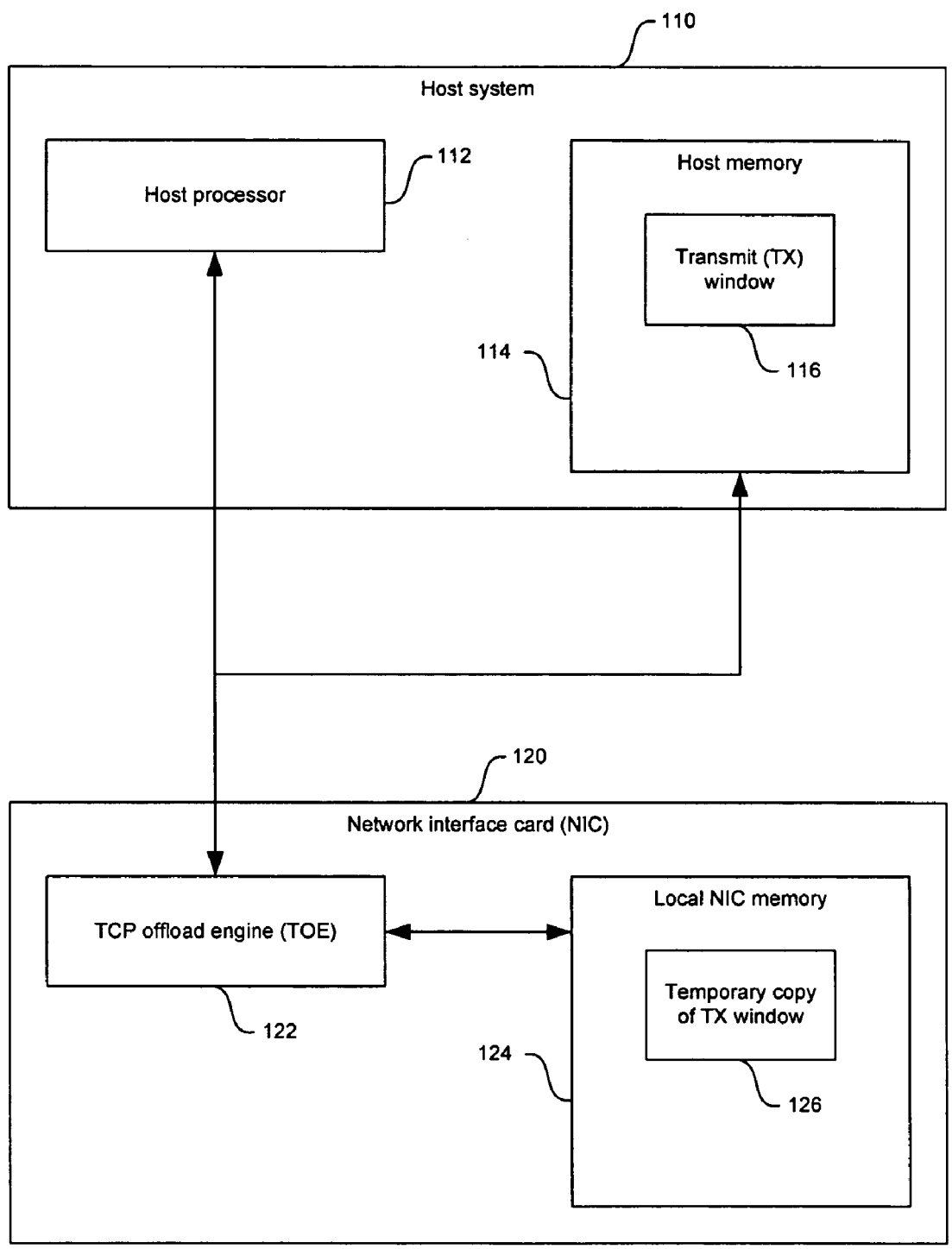
FIG. 1 is a block diagram illustrating an exemplary conventional configuration of a host offloading TCP transmission and retransmission support to a NIC.

FIG. 1 is a block diagram illustrating an exemplary conventional configuration of a host offloading TCP transmission and retransmission support to a NIC. The host 110 may comprise a host processor 112 and a host memory 114. The NIC 120 may comprise a TOE 122 and a local NIC memory 124. A transmit (TX) window 116 may be a portion of the host memory 114 that contains information regarding the packets that may be sent from the host 110. Since the TOE 122 is responsible for TCP transmission, a temporary copy of the TX window 126 may be made onto the local NIC memory 124 from which the TOE 122 may initiate transmission of all packets. When a request for retransmission occurs, the TOE 122 may search the temporary copy of the TX window 126 in the local NIC memory 124 until it locates the packet information that needs to be retransmitted. This temporary copy of the TX window 126 may be kept until all packet and/or byte acknowledgements have been received, at which point the portion of the local NIC memory 124 containing the temporary copy of the TX window 126 may be released and may become available for use by any TCP offload applications or until the next temporary copy of the TX window may need storage.

However, maintaining a temporary copy of the TX window 126 for retransmission purposes requires more hardware storage capacity in the NIC 120 than is needed to only support transmission. With ever increasing network speeds and data rates, complying with such hardware requirements becomes a difficult and costly endeavor. Moreover, additional bandwidth may be required between the TOE 122 and the host memory 114 because limitations in local NIC memory 124 may require TCP applications running on the TOE 122 to access available host memory 114. In addition, requiring the TOE 122 to manage and implement packet search algorithms and processes may increase the architectural complexity and costs associated with its design.

In an embodiment of the present invention, the entire send transmission window may be stored in host memory until reception of all packets has been acknowledged. The TCP retransmit processing may allow for packet retransmission by a specialized processor or TCP/IP offload engine (TOE) without incurring the need to copy and store the send window, or portions of the send window, from the host memory onto a local hardware device on the NIC or onto an on-chip memory component on the TOE. By limiting TOE requests to host memory to only those packets that require retransmission, the TCP retransmit processing minimizes the use of host memory bandwidth for packet retransmission and allows most of the bandwidth to remain available for use by system applications or for other TCP processing applications. TCP retransmit processing allows the TOE to remain a fast and highly specialized processing device suitable for handling TCP applications by using more efficient routines and algorithms that may be available to the host driver.

In TCP, outgoing packets may be stored in designated TCP buffers before being transmitted. TCP buffers are temporary data areas that may be shared by hardware devices or by software or firmware program processes that perform TCP operations. TCP buffers may reside in host memory or in other memory locations from where hardware devices or from where software or firmware program processes that perform TCP operations may have access. TCP buffers may be represented by buffer descriptors residing in host memory or residing in other memory locations from where the host driver, hardware devices, or software or firmware processes may have access. A buffer descriptor is a data structure that contains the address of the TCP buffer, the length of the TCP buffer, and control and status bit fields associated with the TCP buffer. TCP buffers may be represented by single or by multiple buffer descriptors depending on how the information to be transmitted has been organized into data packets. TCP transmits the packets located in the TCP buffers according to the order established by the buffer descriptors. Once the packets in the TCP buffer have been received and acknowledged by a remote peer, the buffer descriptors associated with the TCP buffer may be released.

Figure 2:
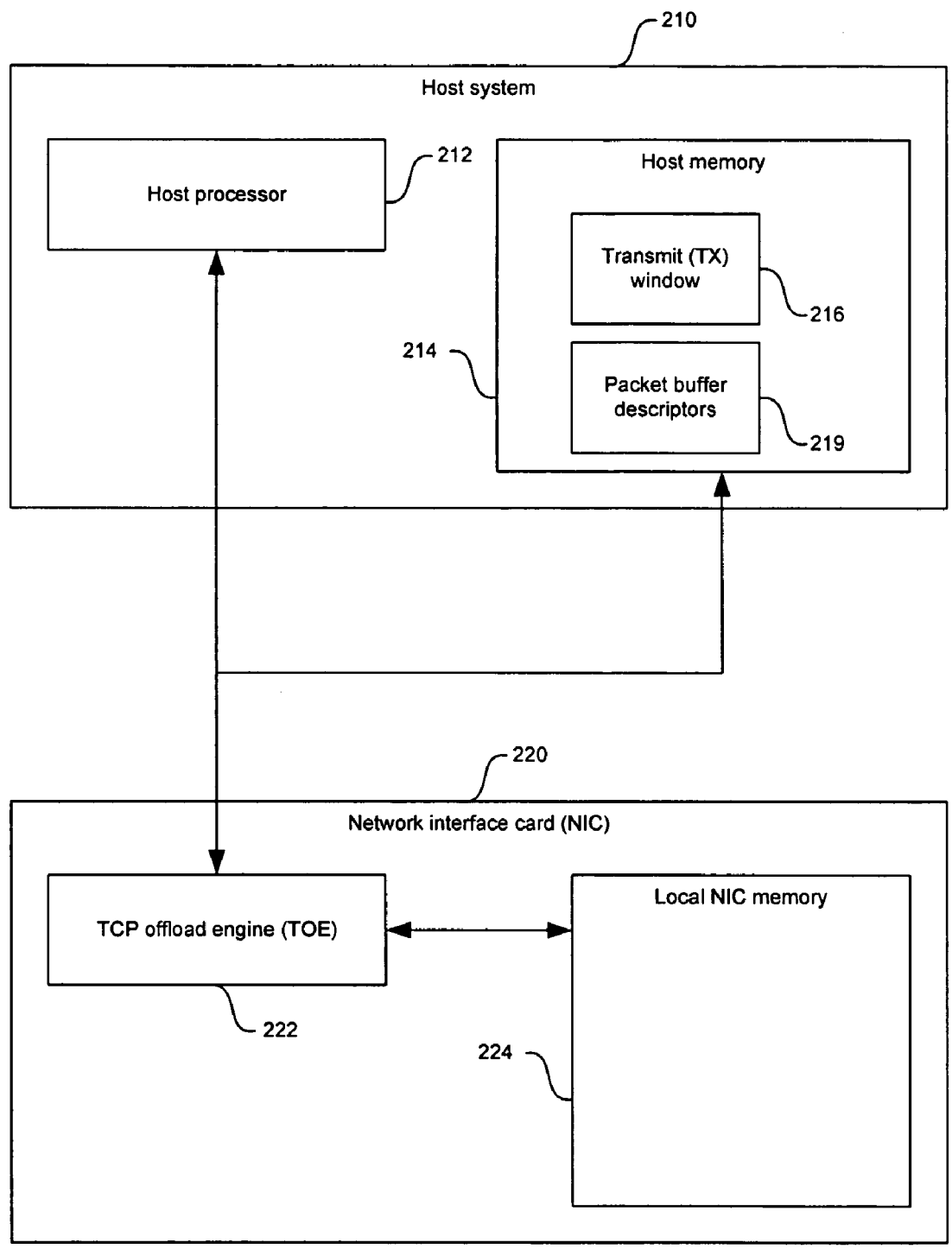
FIG. 2 is a block diagram illustrating an exemplary configuration of a host offloading TCP transmission and retransmission support to a Network Interface Card (NIC), in accordance with an embodiment of the invention.

FIG. 2 is a block diagram illustrating an exemplary configuration of a host offloading TCP transmission and retransmission support to a Network Interface Card (NIC), in accordance with an embodiment of the invention. The host 210 may comprise a host processor 212 and a host memory 214. Within the host memory 214 may reside, in a portion of the memory, a transmission window (TX window) 216 and, in another portion of the memory, a plurality of packet buffer descriptors 219. The NIC 220 may comprise a TCP/IP Offload Engine (TOE) 222 and a local NIC memory 224.

The host processor 212 may comprise suitable logic, circuitry, and/or code that may be adapted to run system applications, TCP applications not offloaded to the NIC 220, and other software applications and drivers. The host memory 214 may comprise suitable logic, circuitry, and/or code that may be adapted to store system data, TCP application data, TX window 216 data, packet buffer descriptors 219, and/or data related to other software applications and drivers. The TX window 216 may be a data area that may comprise TCP send window information, TCP congestion window information, and/or any meta-information related to the TCP send window and the TCP congestion window. The TCP send window information and the TCP meta-information may include TCP buffers that may contain packets for transmission or retransmission.

The TOE 222 may comprise suitable logic, circuitry, and/or code that may be adapted to notify a host driver or a component of the host driver running on the host processor 212 that a packet or portion of a packet needs to be retransmitted and may also ask the host driver or component of the host driver to locate the packet or byte and/or information related to the packet or byte. The TOE 222 may notify the host 210 of the data to be retransmitted by providing data pointers. The host driver may search and may locate the packet buffer descriptors 219 that identify the data to be retransmitted. The packet buffer descriptors 219 may reside in host memory 214, they may reside inside the TX window 216 as TCP send window information, as TCP meta-information, or in some other memory location where the host may have access. At least one buffer descriptor may be necessary to identify the data to be retransmitted. Once the host driver locates the packet buffer descriptors 219, it may send the results, that is, information related to the data to be retransmitted, to the TOE 222 and these results may be stored, for example, in the local NIC memory 224. The TOE 222 may then able to use the information obtained from the packet buffer descriptors 219 to find or locate the appropriate TCP buffer in the host memory 214 that may contain the packet or byte of data to be transmitted. The TOE 222 may then fetch and retrieve the data to be retransmitted from the TCP buffer in host memory 214 and may retransmit the packet to the appropriate remote peer.

The TOE 222 may also be adapted to know the host 210 network address and to manage the TCP processing states, including the internal operating parameters snd_una, snd_nxt, and snd_window, for example. The snd_una parameter may be the TCP sequence number of the first byte that has not been acknowledged. In the TOE 222, snd_una may be represented by the TCP sequence number and not by buffer descriptors, whereas at the host 210, snd_una may be represented by a buffer descriptor index and a byte offset. The snd_nxt parameter may be the TCP sequence number of the next byte to be transmitted. In the TOE 222, snd_nxt may be represented by the TCP sequence number and also by a buffer descriptor index and a byte offset into the first buffer descriptor. The snd_nxt buffer descriptor index and byte offset into the first buffer descriptor may be stored in the local NIC memory 224. The snd_window parameter may be the amount of data that can be transmitted and it may be a combination of both the TCP send window and the TCP congestion window.

The TOE 222 may also be adapted to perform TCP transmission starting at snd_next. Once the data is transmitted, the TOE 222 increments snd_nxt, advances the buffer descriptor index and adjusts the byte offset into the first buffer descriptor. When reception of a packet is acknowledged by a remote peer, the TOE 222 increments snd_una and notifies the host 210 of the new snd_una. The host then maps this new snd_una into its buffer descriptors and completes the buffer represented by the buffer descriptors left to the snd_una. The TOE 222 continues to perform TCP transmission until it reaches snd_window or until it detects a request for retransmission.

If a request for TCP retransmission is detected, either because a retransmission timer has expired or because of a fast retransmit signal, the TOE 222 may begin to operate in TCP retransmission processing and it may reset snd_nxt to the value of snd_una. The TOE 222 may first notify the host 210 of the retransmit request. Then the host 210 may search and locates the buffer descriptor index and byte offset that map to snd_una. Upon completion of the search and the location, the host 210 may send the results back to the TOE 222. The TOE 222 may then reset snd_nxt and its buffer descriptors to the value of snd_una and its buffer descriptors. The TOE 222 may store the new values for snd_nxt in the local NIC memory 224. At this point the TOE 222 may proceed with TCP transmission by starting at snd_nxt by using the information obtained from the packet buffer descriptors 219 to obtain the data to be retransmitted from the TCP buffers in the host memory 214. Once the packet or byte of data is retransmitted and acknowledgement of arrival is received, the packet buffer descriptors 219 may be released.

Figure 3:
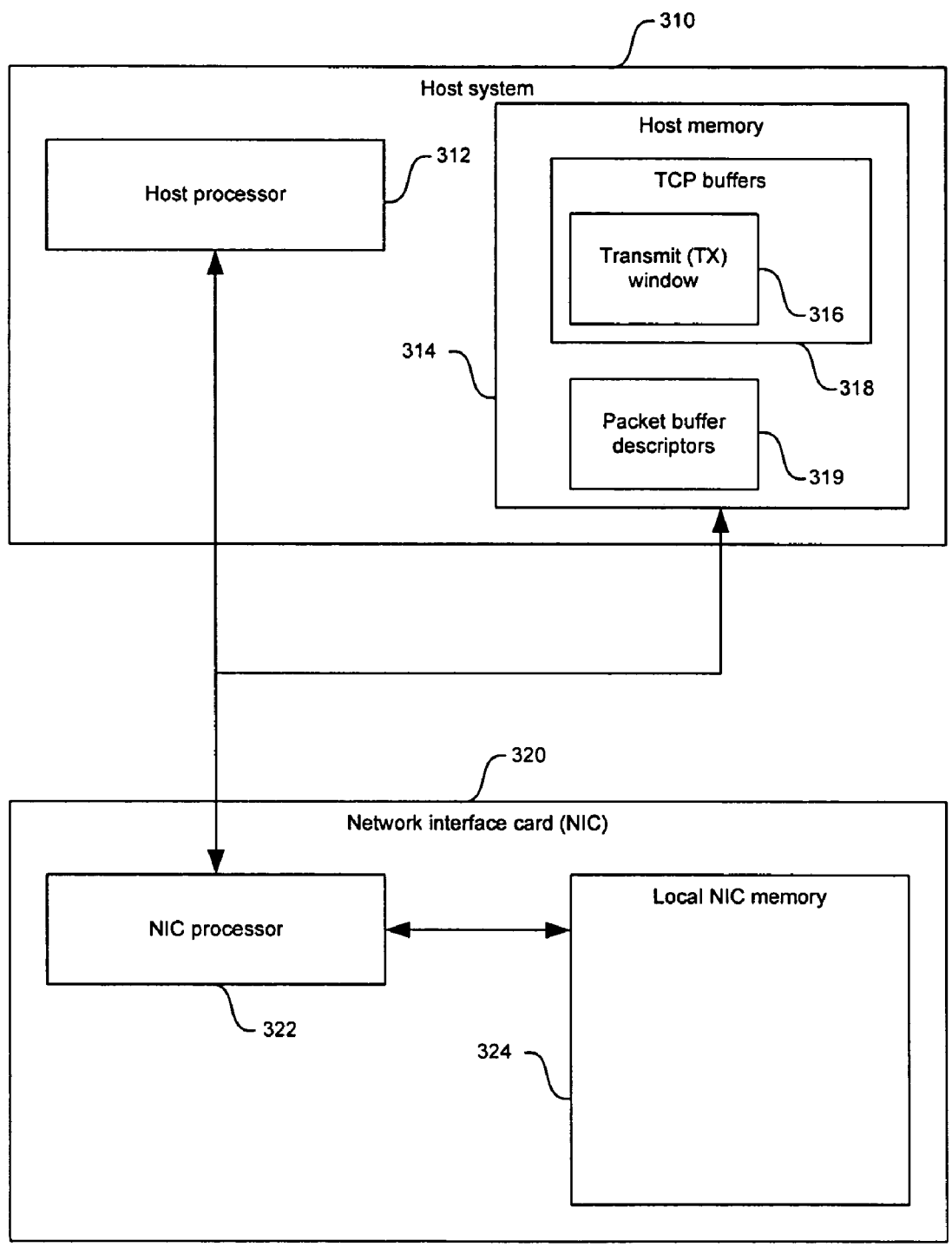
FIG. 3 is a block diagram illustrating an exemplary system for TCP retransmit processing, in accordance with an embodiment of the invention.

FIG. 3 is a block diagram illustrating an exemplary system for TCP retransmit processing, in accordance with an embodiment of the invention. Referring to FIG. 3, the TCP buffers may be shown to indicate the location in the host memory where the transmit window may be located. In this regard, the host 310 may comprise a host processor 312 and a host memory 314. Within the host memory 314 may reside, in a plurality of TCP buffers 318, a transmission window (TX window) 316 and, in another portion of the memory, a plurality of packet buffer descriptors 319. The offload NIC 320 may comprise a NIC processor 322 and a local NIC memory 324.

In operation, the NIC processor 322 may identify a packet or byte from the TX window 316 to be retransmitted by the offload NIC 320. The NIC processor 322 may acquire from a host 310 data descriptors that indicate the location in host memory 314 of the packet to be retransmitted. Once the packet or byte is located in host memory 314, the NIC processor 322 may retransmit the packet without storing at least a portion of the TX window 316 on the NIC 320. Request for retransmission may come from a retransmission timer or from a fast retransmit mechanism. The NIC processor 322 may process the request information and may send to the host 310 the processed information.

The host 310 may receive from the NIC processor 322 processed information and may initiate a search of the host memory 314 for the data to be retransmitted by looking into the TCP buffers 318 that hold the TX window 316. Once the packet or byte is found, the host 310 may map the location of the data location to information in the packet buffer descriptors 319. The host 310 may send information in the packet buffer descriptors 319 to the NIC processor 322 to store in the local NIC memory 324. The NIC processor 322 may utilize information from the packet buffer descriptors 319 to retrieve data to be retransmitted from the host memory 314. The NIC processor 322 may then retransmit the data in accordance with the request information provided by the retransmission timer or the fast retransmit signal mechanisms. The system may further comprise notification by the NIC processor 322 to the host 310 that the packet has been retransmitted.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for packet transmission, the method comprising:
   in an offload NIC:
      identifying a TCP sequence number corresponding to data to be retransmitted by said offload NIC;
      communicating said TCP sequence number to a local host that converts said TCP sequence number to a buffer descriptor index and a byte offset utilized for retrieving said data to be retransmitted from a memory within said host; and
      retransmitting said data to be retransmitted without storing at least a portion of said data to be retransmitted onto said offload NIC.

2. The method according to claim 1, comprising identifying at least a byte of a packet from a transmission window to be retransmitted.

3. The method according to claim 1, comprising receiving acknowledgement information from at least one remote peer to determine said data to be retransmitted.

4. The method according to claim 1, comprising determining said data to be retransmitted based on said received acknowledgement information and on a retransmission timer mechanism or a fast retransmit mechanism.

5. The method according to claim 1, comprising notifying said local host of said data to be retransmitted.

6. The method according to claim 1, wherein said buffer descriptor index and said byte offset are stored in said memory within said local host.

7. The method according to claim 1, comprising receiving said buffer descriptor index and said byte offset from said local host.

8. The method according to claim 7, comprising retrieving said data to be retransmitted from said local host based on said buffer descriptor index and said byte offset.

9. A computer readable storage having stored thereon, a computer program having at least one code section for packet transmission, the at least one code section being executable by a computer for causing the computer to perform steps comprising:
   in an offload NIC:
      identifying in a TCP sequence number corresponding to data to be retransmitted by said offload NIC;
      communicating said TCP sequence number to a local host that converts said TCP sequence number to a buffer descriptor index and a byte offset utilized for retrieving said data to be retransmitted from a memory within said host; and
      retransmitting said data to be retransmitted without storing at least a portion of said data to be retransmitted onto said offload NIC.

10. The computer readable storage according to claim 9, wherein said at least one code section comprises code for identifying at least a byte of a packet from a transmission window to be retransmitted.

11. The computer readable storage according to claim 9, wherein said at least one code section comprises code for receiving acknowledgement information from at least one remote peer to determine said data to be retransmitted.

12. The computer readable storage according to claim 9, wherein said at least one code section comprises code for determining said data to be retransmitted based on said received acknowledgement information and on a retransmission timer mechanism or a fast retransmit mechanism.

13. The computer readable storage according to claim 9, wherein said at least one code section comprises code for notifying said local host of said data to be retransmitted.

14. The computer readable storage according to claim 9, wherein said buffer descriptor index and said byte offset are stored in said memory within said local host.

15. The computer readable storage according to claim 9, wherein said at least one code section comprises code for receiving said buffer descriptor index and said byte offset from said local host.

16. The computer readable storage according to claim 15, comprising code for retrieving said data to be retransmitted from said local host based on said buffer descriptor index and said byte offset.

17. A system for packet transmission, the system comprising:
at least one processor for use on an offload NIC that:
identifies a TCP sequence number corresponding to data to be retransmitted by said offload NIC;
communicates said TCP sequence number to a local host that converts said TCP sequence number to a buffer descriptor index and a byte offset utilized for retrieving said data to be retransmitted from a memory within said host; and
retransmits said data to be retransmitted without storing at least a portion of said data to be retransmitted onto said offload NIC.

18. The system according to claim 17, wherein said at least one processor identifies at least a byte of a packet from a transmission window to be retransmitted.

19. The system according to claim 17, wherein said at least one processor receives acknowledgement information from at least one remote peer to determine said data to be retransmitted.

20. The system according to claim 17, wherein said at least one processor determines said identified data to be retransmitted based on said received acknowledgement information and on a retransmission timer mechanism or a fast retransmit mechanism.

21. The system according to claim 17, wherein said at least one processor notifies said local host of said data to be retransmitted.

22. The system according to claim 17, wherein said buffer descriptor index and said byte offset are stored in said memory within said local host.

23. The system according to claim 17, wherein said at least one processor enables reception of said buffer descriptor index and said byte offset from said local host.

24. The system according to claim 23, wherein said at least one processor enables retrieval of data to be retransmitted based on said buffer descriptor index and said byte offset.

25. The system according to claim 17, wherein said at least one processor is a portion of said offload NIC.

* * * * *